UNITED STATES PATENT OFFICE.

WILLIAM A. HALL, OF BELLOWS FALLS, VERMONT.

ENAMELING COMPOUND AND METHOD OF PRODUCING SAME.

SPECIFICATION forming part of Letters Patent No. 626,537, dated June 6, 1899.

Application filed July 25, 1898. Serial No. 686,839. (No specimens.)

*To all whom it may concern:*

Be it known that I, WILLIAM A. HALL, a citizen of the United States, residing at Bellows Falls, in the county of Windham and State of Vermont, have invented certain new and useful Improvements in Enameling Compounds and Method of Producing Same, of which the following is a specification.

My invention has for its object the production of a coating or enamel for finishing and surfacing paper and which is of such a character that while it gives a smooth and finished surface to the paper treated with it and one which is well adapted to receive the printing-ink it produces a surface which will resist the attacks of moisture and prevent the disintegration of the paper and the disfiguration of the matter printed thereon. In fact, after my improved enamel is thoroughly seasoned it becomes practically waterproof and insoluble, enough so at least to protect the paper against the ordinary attacks of moisture to which the enamels and clay coatings now in use are so susceptible.

The composition which I have produced belongs to that class of clay coatings in which a mineral base—such as clay, blanc fixe, or a similar ingredient—is used to give body to the composition. The adhesive ingredient of the enamel, which is necessary to fix it to the paper or article coated, is casein or milk albumen, the casein being precipitated from the milk by the use of any suitable acid which will throw down the curd, preferably $H_2SO_4$ or HCl, and I preferably leave a small portion of the acid in the curd or casein, as I find that the effect of this acid is to render the curd insoluble after the composition has been applied and has become seasoned, and, furthermore, it leaves the curd in a wholesome and clean condition without imparting to it the "cheesy" odor resulting from rennet curdling or natural souring, which, it is apparent, would be objectionable in a coating or enamel of this kind. To cut and dissolve the curd, any suitable alkali may be used.

I find that a suitable proportion of ingredients for the production of my improved enameling composition is as follows, although it will be understood that these proportions may be varied somewhat and still come within the scope of my invention. The mineral base or clay body forms about eighty per cent. of the composition, while the casein, containing about one per cent. of the free acid used to precipitate the curd, forms about seventeen per cent. of the compound. Any suitable acid may be used to precipitate the curd from the milk—such as sulfuric, acetic, or muriatic acid. To cut the casein and reduce it to a solution, a small amount of alkali, about three per cent. of the composition, is used, and any suitable alkali—such as borax, ammonia, or carbonate of soda—will be suitable for this purpose.

In making the composition I preferably take the dry curd, which contains a small amount of free acid, as stated hereinbefore, the curd after precipitation having been slightly washed, so as to remove only a portion of the acid used in precipitating it, and said dry curd is either mixed with an alkali and the mixture then dissolved in water or an alkaline solution may be made in which the curd is then dissolved. To the casein solution thus obtained the clay or mineral base, worked up smoothly in water, is added until the desired consistency is obtained. If preferred, however, the dry curd containing the free acid, the alkali, and the clay may all be worked up in water at the same time. The coating thus produced is, as stated above, water resisting and practically insoluble and is well adapted to preserve the paper coated with it from the attacks of moisture, this being due to the fact that the effect of the free acid, which forms an ingredient of the composition, is to render the casein practically insoluble in water.

It is well known that pure casein or casein from which the acid has been completely removed by washing does not dry readily, but remains in a soft and friable condition and possesses but little toughness or tenacity. It is readily dissolved in a very weak alkaline solution, and a coating formed from this solution is weak and easily attacked and destroyed by moisture. In the course of my experiments I have discovered that when a percentage of the mineral acid used in precipitating the curd is left in the casein a greater amount of alkali is required to reduce the acid curd, which is in a hard condition, to a solution than when no acid is present and the casein has been thoroughly washed, as stated above. For example, if the acid be removed by washing about seven per cent. of borax will be sufficient to dissolve the comparatively soft and friable curd; but when about one per cent. of acid is left in the curd from ten to fifteen per cent. of borax is necessary to properly reduce this hard acid curd. If soda or ammonia be used as a solvent, from three per cent. to five per cent. would be used with the washed curd and with the acid curd from seven per cent. to ten per cent. would be required. After the coating formed of this solution has been aged for a few days oxidation renders it substantially insoluble. Casein that is thoroughly washed or casein which is thrown down by the use of rennet will not become insoluble when dissolved by an alkali and exposed to oxidation of the air, and the presence of the mineral acid in the solution which I have produced undoubtedly brings about the novel results set forth and produces the coating compound hereinbefore described. The coating after oxidation is very tough and not susceptible to the attacks of moisture, as are the ordinary clay coatings, nor does it become sticky to the touch when moist or damp.

The free acid might be added to the solution instead of being left in the curd; but there is danger of precipitation of the curd if the acid is introduced at this time. The presence of the acid in the curd is also an advantage because of the fact that it helps to preserve it and keep it in good condition.

Having thus described my invention, I claim and desire to secure by Letters Patent—

1. An insoluble coating or enamel for paper composed of casein, a free acid, an alkali, and clay or other suitable mineral base, in substantially the proportions specified.

2. An insoluble coating or enamel for paper composed of casein containing free acid, in substantially the proportions specified.

3. The method of producing an insoluble coating or enameling composition for paper which consists in precipitating casein by the use of an acid, partially washing the casein so as to leave a portion of the acid combined therewith, drying out the acid casein thus produced, dissolving said casein by means of a suitable alkali, and introducing a mineral body or filler to the alkaline-casein solution thus formed.

In testimony whereof I affix my signature in the presence of two witnesses.

WILLIAM A. HALL.

Witnesses:
CUSHING ADAMS,
P. F. DANFORTH.